United States Patent
Lee

(10) Patent No.: US 8,470,104 B2
(45) Date of Patent: Jun. 25, 2013

(54) HIGH STRENGTH VALVE SPRING FOR VEHICLE ENGINE AND METHOD OF MANUFACTURING THE SAME

(75) Inventor: Jung Suk Lee, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 13/036,550

(22) Filed: Feb. 28, 2011

(65) Prior Publication Data

US 2012/0090739 A1    Apr. 19, 2012

(30) Foreign Application Priority Data

Oct. 19, 2010  (KR) .......................... 10-2010-010854

(51) Int. Cl.
*C21D 9/02*     (2006.01)
(52) U.S. Cl.
USPC ............................................ 148/580; 72/135
(58) Field of Classification Search
USPC ....... 29/896.9–896.93; 72/135–145; 148/559, 148/580; 267/166–180
See application file for complete search history.

(56) References Cited

U.S. PATENT DOCUMENTS

2006/0201588 A1   9/2006   Suda et al.
2011/0209514 A1*  9/2011   Huon .............................. 72/145

FOREIGN PATENT DOCUMENTS

| FR | 2937890 A1 * | 5/2010 |
| JP | 05-148581 A | 6/1993 |
| KR | 10-1999-0043795 | 6/1999 |
| KR | 10-2000-0074166 A | 12/2000 |
| KR | 10-0500597 | 2/2001 |
| KR | 10-0323468 | 4/2001 |
| KR | 10-2002-0019737 | 3/2002 |
| KR | 10-2004-0083545 | 10/2004 |
| KR | 10-2005-0105281 A | 11/2005 |

* cited by examiner

*Primary Examiner* — Steven Bos
*Assistant Examiner* — Brian Walck
(74) *Attorney, Agent, or Firm* — Edwards Wildman Palmer LLP; Peter F. Corless

(57) ABSTRACT

A method of manufacturing a high strength valve spring for a vehicle engine is provided, which includes (a) forming a high strength wire rod in the form of a spring using a roller type jig, (b) cutting an end of the formed spring using a rotary type cutting blade, (c) performing residual stress removal heat treatment at 390° C. to 410° C. for 20 to 40 minutes, (d) performing shot peening for applying compression stress to a surface of the spring with fine ball particles, and (e) performing hot setting for applying, in advance, plastic deformation to the spring. Accordingly, the damage of the spring during the spring forming process is prevented, and the hardness deterioration of the spring during the residual stress removal heat treatment process is also prevented.

1 Claim, 5 Drawing Sheets

<Prior Art>

<Prior Art>

<ROLLER TYPE JIG AND ROTARY TYPE CUTTING METHOD>

HIGH STRENGTH VALVE SPRING FOR VEHICLE ENGINE AND METHOD OF MANUFACTURING THE SAME

CROSS-REFERENCE TO RELATED APPLICATION

This application is based on and claims priority from Korean Patent Application No. 10-2010-0101854, filed on Oct. 19, 2010 in the Korean Intellectual Property Office, the disclosure of which is incorporated herein in its entirety by reference.

BACKGROUND OF THE INVENTION

1. Field of the Invention

The present invention relates to a method of manufacturing a high strength valve spring for a vehicle engine and a high strength valve spring manufactured using the same. More particularly, the present invention relates to a high strength valve spring for a vehicle engine and a method of manufacturing the same, which can prevent damage and deterioration of the spring, particularly wherein the spring is formed using a high strength wire rod.

2. Description of the Prior Art

A valve spring for a vehicle engine interlocks with a device that connects a valve with a cam shaft, such as a cam shaft and a swing arm in an engine, a tappet, and the like, and adjusts opening and closing of an intake valve and an exhaust valve.

A process of manufacturing a valve spring for an engine in the related art, as illustrated in FIG. 1, includes a forming process and a cutting process for forming a wire rod into a spring shape, a residual stress removal heat treatment process for removing a residual stress occurring on inner and outer surfaces after forming, a shot peening process for applying a compression stress to the surface with fine ball particles to increase fatigue strength, and a hot setting process for applying plastic deformation in advance to increase deformation resistance.

A wire rod that has been used to manufacture a valve spring in the related art is mainly a Si—Cr steel wire rod having tensile strength of 1900 MPa. This wire rod is formed into shape form of a spring using a coiling jig as illustrated in FIG. 2. As shown, a cutting blade descends vertically to cut and separate an end portion of the formed spring.

After forming the spring, a residual stress occurs on an inner surface and an outer surface of the spring. Specifically, a compression residual stress occurs on the outer surface, and a tensile residual stress occurs on the inner surface. Since the tensile residual stress that occurs on the inner surface lowers the fatigue strength of the spring, a residual stress removal heat treatment process is performed to remove the tensile residual stress.

The residual stress removal heat treatment is maintained at 410 to 420° C. for 20 to 30 minutes.

After the residual stress removal heat treatment, a shot peening process for artificially generating a compression residual stress on the surface of the valve spring is performed to increase the fatigue stress.

The shot peening is performed with SWRH82A as a material. In particular, shot peening using a shot ball having a diameter of 0.6 mm is first carried out for 40 minutes, followed by shot peening using a shot ball having a diameter of 0.3 mm for 20 minutes.

After the shot peening, a hot setting process is performed. The hot setting process is a process that applies, in advance, plastic deformation to the spring, and thus prevent deformation during driving in an engine.

The hot setting process compresses the valve spring up to the maximum displacement for 1.0 to 1.5 seconds after maintaining the spring at 220° C. to 230° C. for 10 to 15 minutes. At this time, a plastic deformation occurs, and resistivity against deformation during the actual driving of the valve spring is increased by work-hardening.

However, in applying the conditions of the valve spring manufacturing process in the related art to a high strength wire rod, a number of problems occur.

First, if the conventional jig (hereinafter referred to as a "fixed jig") is applied during the formation of the spring, deformation occurs due to friction, and the valve spring is broken or fine cracks occur therein during spring formation.

Also, if the conventional cutting method (hereinafter referred to as "vertical cutting") is used, in the case of a high strength wire rod, the impact toughness is relatively low. As such, cracks occur on portions of the spring other than the cut surface due to the impact during cutting.

Further, if the conventional temperature and time conditions are applied in the residual stress removal heat treatment process, while the residual stress may be removed, the hardness and the strength are lowered due to mutual reactions of the alloying elements. As a result, these advantages of the high strength valve spring are lost.

Still further, if the conventional conditions are applied during the hot setting process, the deformation resistance effect of the process is decreased.

In order to solve the above-described problems, according to an embodiment of the present invention, damage to the spring is prevented by improving the forming jig during the forming and the cutting method. Further, the deterioration in hardness is prevented and the residual stress is removed by applying optimum temperature and time conditions during the residual stress removal heat treatment process. Also, by applying optimum hot setting temperature and time conditions, the deformation resistance is increased.

SUMMARY OF THE INVENTION

Accordingly, the present invention has been made to solve the above-mentioned problems occurring in the prior art while.

The present invention provides a method of manufacturing a high strength valve spring for a vehicle engine and a high strength valve spring manufactured using the same. According to the present invention, damage of the spring during a spring forming process can be prevented, and hardness deterioration of the spring during a residual stress removal heat treatment process can be prevented.

The present invention also provides a method of manufacturing a high strength valve spring for a vehicle engine and a high strength valve spring manufactured using the same, which can improve friction reduction. In particular, friction reduction can be improved by increasing deformation resistance in the spring, particularly by changing the conditions in a hot setting process.

In one aspect of the present invention, there is provided a method of manufacturing a high strength valve spring for a vehicle engine, which includes the steps of (a) forming a high strength wire rod in the form of a spring using a roller type jig; (b) cutting an end of the formed spring using a rotary type cutting blade; (c) performing residual stress removal heat treatment at a suitable temperature and time, particularly about 390° C. to 410° C. for about 20 to 40 minutes; (d) performing shot peening to apply compression stress to a surface of the spring with fine ball particles; and (e) performing hot setting for applying, in advance, plastic deformation to the spring.

Here, it is preferable that the step (e) is carried out at about 235° C. to 245° C. for about 15 to 25 minutes, followed by applying a load at a maximum spring displacement for about 1.5 to 2.5 seconds.

It is preferable that in step (d) the shot peening process is is performed with SWRH82A as a material. In particular, according to an embodiment of the present invention, shot peening using shot balls having a diameter of about 0.6 mm for about 40 minutes, followed by shot peening using shot balls having a diameter of about 0.3 mm for about 20 minutes.

In another aspect of the present invention, there is provided a high strength valve spring for a vehicle engine manufactured using the above-described manufacturing method.

According to various embodiments of the present invention, it is preferable that the high strength wire rod of the valve spring includes a combination of one or more materials selected from carbon, silicon, manganese, phosphor, sulfur, chrome, vanadium, molybdenum, nickel and boron. For example, according to an embodiment of the present invention, the high strength wire rod of the valve spring comprises about 0.63 to 0.69 wt % of carbon (C), about 2.10 to 2.30 wt % of silicon (Si), about 0.60 to 0.80 wt % of manganese (Mn), about 0.020 wt % or less of phosphor (P), about 0.020 wt % or less of sulfur (S), about 0.80 to 1.00 wt % of chrome (Cr), about 0.10 to 0.20 wt % of vanadium (V), about 0.05 to 0.15 wt % of molybdenum (Mo), about 0.25 to 0.35 wt % of nickel (Ni), and about 0.001 to 0.005 wt % of boron (B).

As described above, according to the present invention, the damage of the spring during the spring forming process can be prevented, and the hardness deterioration of the spring during the residual stress removal heat treatment process can be prevented. Also, the friction reduction can be improved, particularly by increasing the deformation resistance through the presently described conditions in the hot setting process.

BRIEF DESCRIPTION OF THE DRAWINGS

The above and other features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described in greater detail with reference to the accompanying drawings.

Figure 1:
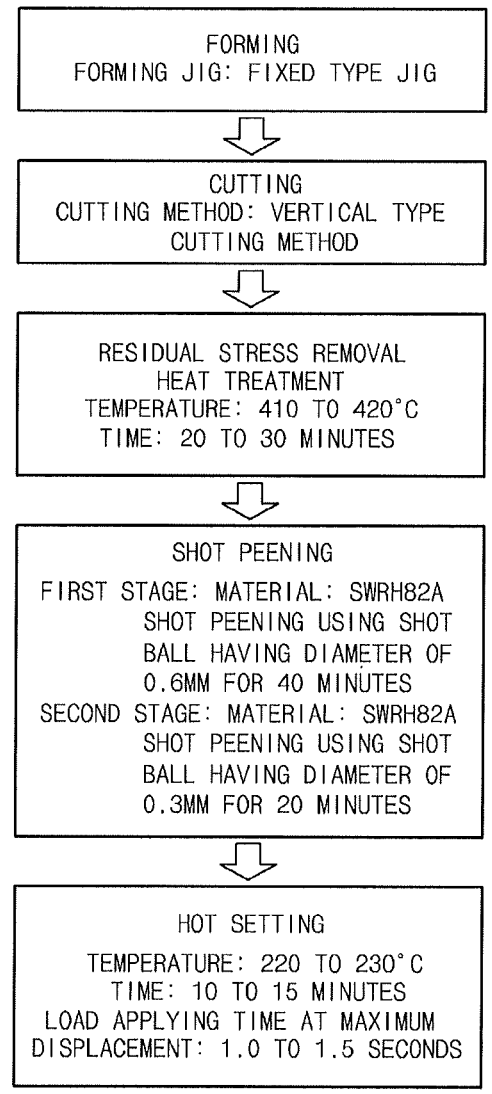
FIG. 1 is a diagram illustrating a process of manufacturing a valve spring for a vehicle engine in the related art.
Figure 2:
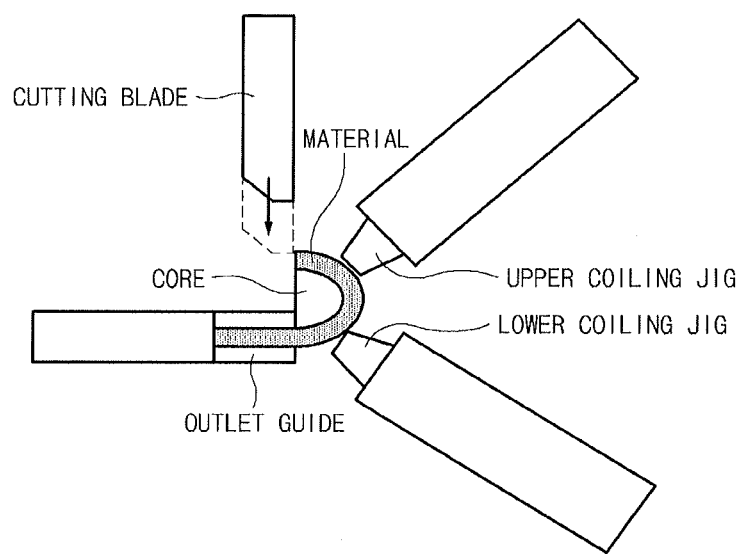
FIG. 2 is a view schematically illustrating the spring forming and cutting method in accordance with the process of FIG. 1.
Figure 3:
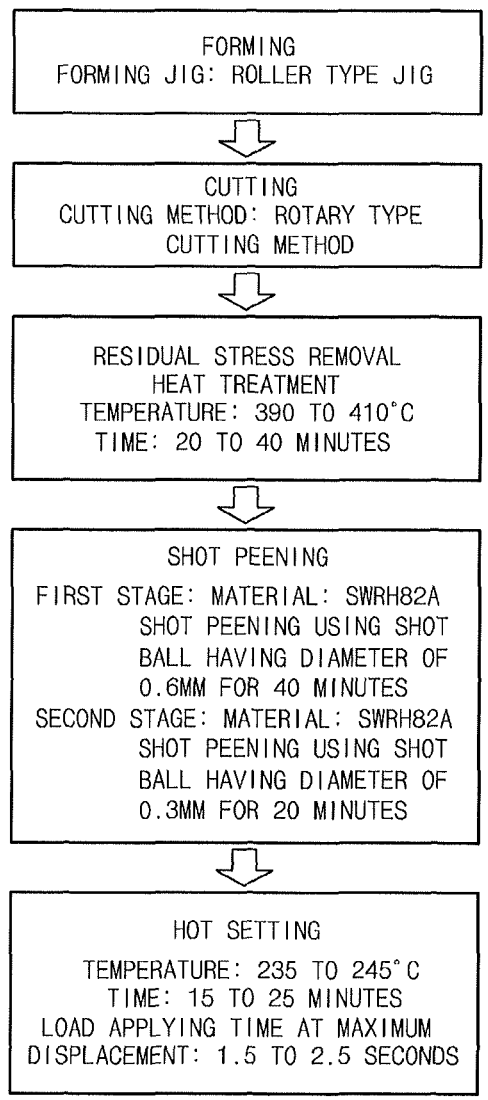
FIG. 3 is a diagram illustrating a process of manufacturing a valve spring for a vehicle engine according to an embodiment of the present invention.

A method of manufacturing a high strength valve spring for a vehicle engine is provided. In particular, according to an embodiment of the present invention, as illustrated in FIG. 3, the method of manufacturing a high strength valve spring for a vehicle provides an improved forming jig, an improved cutting method, improved residual stress removal heat treatment process and conditions, and an improved hot setting process and conditions. Further, according to embodiments of the present invention, a wire rod is used for the formation of the valve spring, wherein the wire rod is a high strength wire rod having a tensile strength of at least 2000 MPa, particularly at least 2100 MPa, more particularly at least 2200 MPa, and for example, about 2200 to 2450 MPa.

Figure 4:
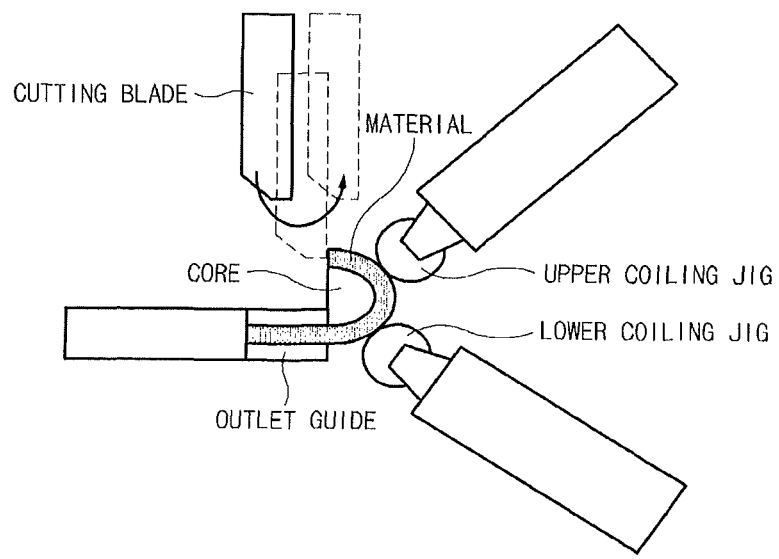
FIG. 4 is a view schematically illustrating the spring forming and cutting method in accordance with the method of FIG. 3.

According to the forming method according to an embodiment of the present invention, as illustrated in FIG. 4, a roller is inserted into a forming jig (hereinafter referred to as a "roller type jig"), and the friction and impact during the forming are thereby minimized.

According to the present invention, use of the roller type jig is adopted as the forming jig, and as a result, unnecessary bending deformation is suppressed by reducing friction during the forming. This is in contrast with the use of the conventional jig, which results in unnecessary additional bending deformation due to friction during the forming. In the case of a high strength liner material, the toughness is relatively low in comparison to a general spring material, and thus, fine cracks may occur when the conventional jig is used. According to an embodiment of the present invention, the roller is inserted which reduces the friction during the forming, and thus the unnecessary bending deformation can be suppressed.

According to the cutting method according to an embodiment of the present invention, a cutting blade applies a load to a cut portion as the blade forms a curve to thereby reduce the impact (hereinafter referred to as "rotary type cutting"). This is in contrast with the conventional cutting method in which a cutting blade descends vertically. In cutting a spring material using the conventional cutting method, in the case of a high strength wire rod having insufficient toughness in comparison to the conventional spring material, a breakage occurs on a portion other than the intended cut surface due to an impact during the cutting. According to an embodiment of the present invention, by adopting a rotary type cutting method, an impact that is transferred to a valve spring is minimized, and thus it is possible to cut the intended portion.

In the related art, the temperature and time for a residual stress removal heat treatment are set to 410° C. to 420° C. and 20 to 30 minutes, respectively. According to an embodiment of the present invention, the temperature and time for the residual stress removal heat treatment are set to 390 to 410° C. and 20 to 40 minutes, respectively.

In accordance with embodiments of the present invention, the residual stress removal heat treatment conditions are set to 390 to 410° C. and 20 to 40 minutes so as to remove the residual stress without hardness deterioration. In particular, if the heat treatment is performed at a temperature below 390°

C. for less than 20 minutes, the residual stress is not removed. On the other hand, if the heat treat is performed at a temperature above 410° C. for more than 40 minutes, fine carbides in the spring wire rod become large-sized to cause the occurrence of hardness deterioration. Accordingly, in an embodiment of the present invention, residual stress is removed without hardness deterioration by performing the heat treatment in accordance with the conditions proposed.

The hot setting process in the related art is performed by maintaining the temperature at 220° C. to 230° C. for 10 to 15 minutes, and then applying a load at the maximum displacement of the valve spring for 1.0 to 1.5 seconds. On the other hand according to an embodiment of the present invention, the hot setting process is performed by maintaining at the temperature at 235° C. to 245° C. for 15 to 25 minutes, and then applying a load at the maximum displacement of the valve spring for 1.5 to 2.5 seconds.

In this case, it has been found that if the hot setting process is performed at less than 235° C. for less than 15 minutes, the deterioration of the yield strength is slight on the corresponding conditions, and the amount of the plastic deformation when the load is applied at the maximum displacement of the spring is not large to, thereby provide little to no effect of increasing the deformation resistance. On the other hand, if the hot setting process is performed at more than 245° C. for more than 25 minutes, the deterioration of the yield strength becomes severe on the corresponding conditions, and the plastic deformation occurs excessively to the severely shorten the length of the spring so that it becomes difficult to impossible to install the spring in the engine.

It has further been found, with respect to the time the load is applied at the maximum displacement of the valve spring, that if the load is applied for less than 1.5 seconds, the plastic deformation does not occur stably due to the too short time. On the other hand, if the load is applied for more than 2.5 seconds, the resultant effect becomes the same (i.e. no further effect is realized). Accordingly, the hot setting conditions are set so as to maintain the temperature at 235 to 245° C. for 15 to 25 minutes, and then to apply a load at the maximum displacement of the valve spring for 1.5 to 2.5 seconds.

It has been confirmed through several analyses that the present valve spring manufacturing process provides superior deformation resistance and superior friction reduction through the prevention of damage during formation and the prevention of hardness deterioration during the residual stress removal heat treatment. Further, the manufacturing process according to the present invention can be applied to the manufacturing of the valve spring for a vehicle engine using a wire rod for a high strength valve spring having the tensile strength in excess of 1900 MPa, for example in excess of 2000 MPa, in excess of 2100 MPa, and for example from 2200 MPa to 2450 MPa.

Hereinafter, an embodiment of the present invention will be described in detail.

An embodiment of the present invention to be described hereinafter is merely exemplary, and thus the present invention is not limited to such an embodiment.

Forming and Cutting Processes

Embodiment and Comparative Examples 1 to 3

TABLE 1

Forming Test Conditions

| Section | Forming Jig | Cutting Method | Tensile Strength of Applied Material |
|---|---|---|---|
| Embodiment | Roller type Jig | Rotary Cutting | 2350 MPa |
| Comparative Example 1 | Roller type Jig | Vertical Cutting | 2350 MPa |
| Comparative Example 2 | Fixed type Jig | Rotary Cutting | 2350 MPa |
| Comparative Example 3 | Fixed type Jig | Vertical Cutting | 1950 MPa |

Embodiment: A roller type jig and a rotary type cutting method according to the present invention are used.

Comparative example 1: A forming jig according to the present invention was used and a cutting method of a conventional technique was used.

Comparative example 2: A conventional forming jig was used and a cutting method according to the present invention was used.

Comparative example 3: A conventional technique was used for a material having tensile strength 1950 MPa.

TABLE 2

Chemical Components of an Applied Material

| Section | | C | Si | Mn | P | S | Cr | V | Mo | Ni | B |
|---|---|---|---|---|---|---|---|---|---|---|---|
| Embodiment Comparative Examples 1) and 2) | Range | 0.63–0.69 | 2.10–2.30 | 0.60–0.80 | 0.020 or less | 0.020 or less | 0.80–1.00 | 0.10–0.20 | 0.05–0.15 | 0.25–0.35 | 0.001–0.005 |
| | Actual Measured Value | 0.65 | 2.21 | 0.71 | 0.005 | 0.005 | 0.91 | 0.14 | 0.08 | 0.21 | 0.003 |
| Comparative Example 3) | Range | 0.50–0.60 | 1.30–1.60 | 0.60–0.80 | 0.020 or less | 0.020 or less | 0.60–0.80 | — | — | — | — |
| | Actual Measured Value | 0.55 | 1.32 | 0.69 | 0.005 | 0.006 | 0.72 | — | — | — | — |

TABLE 3

Forming Test Results

| Section | Damage during Forming | Damage during Cutting | Forming Property |
|---|---|---|---|
| Embodiment | Non-occurrence | Non-occurrence | Suitable to material of tensile strength of 2350 MPa |
| Comparative Example 1) | Non-occurrence | Damage | Unsuitable |
| Comparative Example 2) | Damage | — | Unsuitable |
| Comparative Example 3) | Non-occurrence | Non-occurrence | Suitable to material of tensile strength of 1950 MPa |

As demonstrated by the results in Table 3, in forming and cutting a high strength material having tensile strength of 2200 MPa to 2450 MPa, the formability was secured by using a roller type jig and a rotary type cutting method according to an embodiment of the present invention.

Residual Stress Removal Heat Treatment

Embodiment and Comparative Examples 1 and 2

TABLE 4

Residual Stress Removal Heat Treatment Conditions

| Section | Temperature | Time | Tensile Strength of Applied Material |
|---|---|---|---|
| Embodiment | 400° C. | 40 minutes | 2350 MPa |
| Comparative Example 1) | 420° C. | 30 minutes | 2350 MPa |
| Comparative Example 2) | 420° C. | 30 minutes | 1950 MPa |

Embodiment: Heat treatment conditions according to the present invention were used with respect to a material having tensile strength of 2350 MPa.

Comparative example 1: Conventional Heat treatment conditions were used with respect to a material having tensile strength of 2350 MPa.

Comparative example 2: Conventional Heat treatment conditions were used with respect to a material having tensile strength of 1950.

The spring was formed by applying the forming and cutting conditions proposed according to the present invention, the cross-section of the spring was cut, and the hardness of the spring before heat treatment was measured according to KS B 0811 (Vickers hardness test method). Also, the spring was formed by applying the forming and cutting conditions proposed according to the present invention, and then a residual stress removal heat treatment was performed on the conditions in Table 4. The heat-processed spring was cut, and the hardness of its cross-section was measured according to KS B 0811 (Vickers hardness test method). The hardness changes before and after the heat treatments were compared from the hardness measured data. Also, in order to confirm whether to remove the residual stress, the residual stress of the spring before and after the heat treatment was measured according to ASTM E1426 (Standard Test Method for Determining the Effective Elastic Parameter for X-ray Diffraction Measurement of Residual Stress).

TABLE 5

Hardness Change and Residual Stress Measurement Results before/after Residual Stress Removal Heat Treatment

| Section | Hardness before Heat Treatment | Hardness after Heat Treatment | Residual Stress before Heat Treatment | Residual Stress after Heat Treatment |
|---|---|---|---|---|
| Embodiment | 704 HV | 695 HV | 241 MPa | 35 MPa |
| Comparative Example 1) | 704 HV | 623 HV | 238 MPa | 32 MPa |
| Comparative Example 2) | 593 HV | 575 HV | 245 MPa | 36 MPa |

As shown in Table 5, in the case of applying the conventional technique of Comparative example 2 to a low strength material, the residual stress was removed with slight hardness deterioration. However, in the case of applying the conventional heat treatment conditions to a high strength wire rod, the hardness deterioration occurred after the heat treatment as in Comparative example 1. In the case of applying the heat treatment conditions proposed according to the present invention, the hardness deterioration was less than 10HV. In the to case of applying the heat treatment conditions proposed according to the present invention, the residual stress was removed to a level that is equivalent to that on the conventional conditions.

Hot Setting Process

Embodiment and Comparative Example

TABLE 6

Hot Setting Test Conditions

| Section | Temperature | Time | Load Applying Time | Tensile Strength of Applied Material |
|---|---|---|---|---|
| Embodiment | 240° C. | 15 minutes | 1.5 seconds | 2350 MPa |
| Comparative Example | 230° C. | 10 minutes | 1.0 seconds | 2350 MPa |

Embodiment: Hot setting conditions according to the present invention were used with respect to a material having tensile strength of 2350 MPa.

Comparative example: Conventional hot setting conditions were used with respect to a material having tensile strength of 2350 MPa.

The spring was formed by applying the forming and cutting conditions proposed according to the present invention, and then the residual stress removal heat treatment was performed on the conditions according to the present invention. The hot setting process was performed with respect to the heat-treated spring on the conditions in Table 6. In order to check the deformation resistance of the springs of which the hot setting process had been performed in Embodiment and Comparative example, a load was applied up to the maximum displacement of the spring at 100° C., and then the spring length change ratio was measured after 24 hours. The length change ratio means a value that is obtained by measuring a length L0 after the hot setting, applying a load up to the maximum displacement of the spring at 100° C., measuring a length L1 after 24 hours, and then dividing a value (L0-L1) by L0.

TABLE 7

| Hot Setting Text Results | |
|---|---|
| Section | Length Change Ratio |
| Embodiment | 5.1% |
| Comparative Example | 7.2% |

As shown in Table 7, in the case of applying the conventional technique of Comparative example to a high strength material, the length change ratio exceeded 6%, which has been generally regulated as the valve spring deformation standard. However, in the case of applying the hot setting conditions proposed according to the present invention to a high strength material, the length change ratio was at a level of 5%, which is superior.

Friction Torque Test

Embodiment and Comparative Example

TABLE 8

Manufacturing Conditions of a Valve Spring of which Friction Torque is to be tested.

| Section | Forming | Cutting | Residual Stress Removal Heat Treatment | Hot Setting | Tensile Strength of Applied Material | Spring Diameter |
|---|---|---|---|---|---|---|
| Embodiment | Roller type Jig | Rotary type Cutting Method | 400° C., 40 minutes | Load Applying for 1.5 sec. after Heat Treatment at 240° C. for 15 min. | 2350 MPa | 2.9 mm |
| Comparative Example | Fixed type Jig | Vertical type Cutting Method | 420° C., 30 minutes | Load Applying for 1 sec. after Heat Treatment at 230° C. for 10 min. | 1950 MPa | 3.4 mm |

Figure 5:
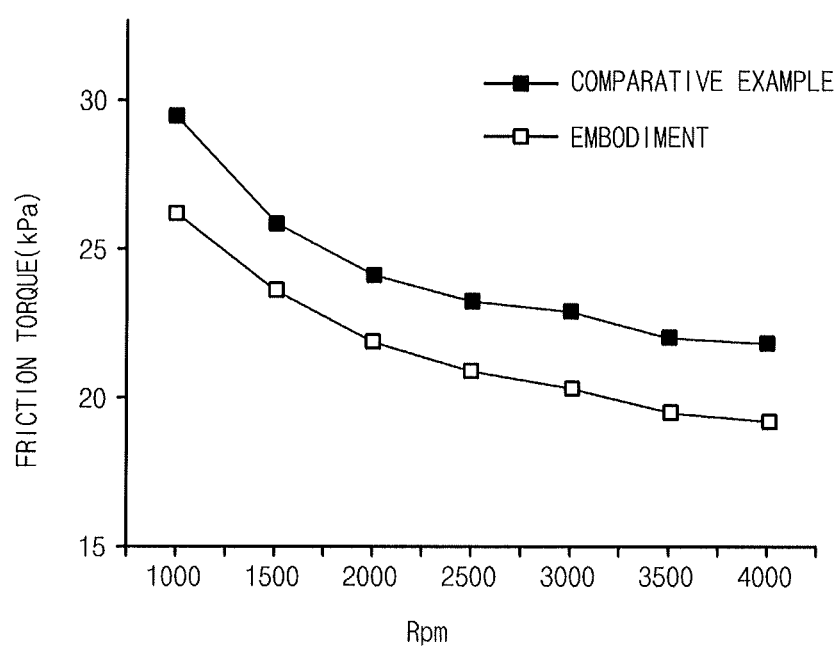
FIG. 5 is a graphical comparison illustrating the difference in frictional torque in relation to revolutions per minute as illustrated by the exemplary embodiment of the present invention.

Referring to FIG. 5, a friction torque surface pressure between a diameter-reduced light-weight spring, which was manufactured by applying the conditions of the forming process, cutting process, residual stress removal heat treatment process, hot setting process according to an embodiment of the present invention, and a cam shaft of a valve spring, which was manufactured by a conventional manufacturing process in Comparative example, was measured. The friction torque surface pressure was measured by mounting a torque meter on the cam shaft, and the surface pressure value was read from the torque meter as the number of rotations of the cam shaft is increased.

x

As seen in FIG. 5, the result of the friction torque test, in the Embodiment (in accordance with the present invention), it can be seen that the friction torque is reduced by 15 to 20% in comparison to the Comparative example. The reason why the friction torque is reduced is as follows. The high strength material used in the Embodiment has high resistance against the stress acting on the cross-section, and thus the diameter can be reduced. Also, during the diameter reduction, the spring constant and the spring load are reduced. If the spring load is reduced, the surface pressure acting on the cam shaft during driving is reduced to lower the friction torque. The reduction of the friction torque causes a prominent effect in fuel economy improvements. Thus, by applying the process conditions according to the present invention, a high strength valve spring having superior friction reduction can be manufactured.

As further demonstrated by the forming, cutting experiment, residual stress removal heat treatment experiments, and hot setting experiment, application of the process conditions according to the present invention to a high strength material at a level of 2200 to 2450 MPa is possible, and superior friction reduction effects were obtained as demonstrated by measuring the cam shaft surface pressure that is applied from the valve spring of which the diameter is reduced using the high strength light-weight valve spring manufactured from the conditions proposed according to the present invention.

As described above, according to the present invention, damage of the spring during the spring forming process can be prevented, and the hardness deterioration of the spring during the residual stress removal heat treatment process can be prevented.

Also, the friction reduction can be improved by increasing the deformation resistance through the presently described conditions in the hot setting process.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A method of manufacturing a high strength valve spring for a vehicle engine, comprising the steps of:
    (a) forming a wire rod having a tensile strength of about 2200 to 2450 MPa in the form of a spring by coiling with a roller type jig;
    (b) cutting an end of the formed spring using a rotary type cutting blade;
    (c) performing residual stress removal heat treatment at about 390° C. to 410° C. for about 20 to 40 minutes;
    (d) performing shot peening for applying compression stress to a surface of the spring with shot balls; and
    (e) performing hot setting for applying, in advance, plastic deformation to the spring,
    wherein the step (e) maintains a temperature at 235° C. to 245° C. for 15 to 25 minutes, followed by applying a load at a maximum spring displacement for about 1.5 to 2.5 seconds; and
    the step (d) performs the shot peening process with SWRH82A as a material, by first using shot balls having a diameter of about 0.6 mm for about 40 minutes, and then using shot balls having a diameter of about 0.3 mm for about 20 minutes.

* * * * *